Nov. 19, 1968   F. M. LEFIEF   3,411,667
METHOD OF AND DEVICE FOR FILLING ICE CREAM AND
THE LIKE INTO PACKAGING RECEPTACLES
Filed Jan. 23, 1967   3 Sheets-Sheet 1

INVENTOR.
Frank M. Lefief
BY
Howard G. Russell
his ATTORNEY

United States Patent Office 3,411,667
Patented Nov. 19, 1968

3,411,667
METHOD OF AND DEVICE FOR FILLING ICE CREAM AND THE LIKE INTO PACKAGING RECEPTACLES
Frank M. Lefief, Palo Alto, Calif., assignor to Kliklok Corporation, New York, N.Y., a corporation of Delaware
Filed Jan. 23, 1967, Ser. No. 610,995
5 Claims. (Cl. 222—1)

ABSTRACT OF THE DISCLOSURE

In the filling of ice cream cartons through a conventional filler nozzle the present improvement provides, at the beginning of a filling operation, for a restriction, at the nozzle, of the flow therefrom for a period sufficient to cool the nozzle and its supply duct. The restricted outflow by-passes cartons. The nozzle restriction is removed, and carton filling commences, when the nozzle and duct are sufficiently cooled.

---

Receptacles for the retail trade of ice cream, sherbet, frozen custard and the like are generally filled by automatic machinery comprising a filler nozzle through which the frozen product (herein collectively referred to as "ice cream") passes into the paperboard carton, plastic container or other kind of receptacle.

In the filling of the receptacle a certain weight-to-volume relationship must be maintained, as legal minimum weight limits and economic maximum weight limits must be observed for a receptacle of a certain volumetric size.

The weight-to-volume relationship of ice cream is affected by its temperature which also affects the handling of the receptacles in the filling plant.

During periods of non-operation the filler nozzle is shut off at a valve in the duct leading from the freezer to the nozzle, and the nozzle assumes room temperature. At the beginning of a filling period the temperature of the ice cream first to emerge from the filler nozzle is unduly raised, as the ice cream picks up heat from the duct portion between the valve and the nozzle and from the nozzle itself. Between five and ten receptacles are thus affected, and it is the general practice to remove these receptacles from the packaging line, return the ice cream for refreezing, if feasible, and to discard the receptacles. Occasionally spillage occurs during this procedure which makes it even more wasteful.

Eventually the flowing ice cream cools duct and nozzle to the normal operating temperature at which time then the proper weight volume relationship is attained.

The described procedure is repeated every time the operation of the filling line is resumed after an interruption or a change in flavors.

The present invention makes it possible for the duct and nozzle to be cooled without waste of ice cream and spoilage of containers. It involves essentially a temporary restriction of the ice cream flow rate through the nozzle in order to reduce the volume of ice cream to be returned for refreezing and the by-passing of containers during the cool-down period during which the ice cream is directed from the nozzle into a bulk container for return to the freezer.

The various objects, features and advantages of this invention will appear more fully from the detailed description which follows accompanied by drawings showing, for the purpose of illustration, a preferred embodiment of the invention and the manner of practicing it. The invention also resides in certain new and original features of construction and combination of elements, as well as steps and sequences of steps as hereinafter set forth and claimed.

Although the characteristic features of the invention which are believed to be novel will be particularly pointed out in the claims appended hereto, the invention itself, its objects and advantages, and the manner in which it may be carried out may be better understood by referring to the following description taken in connection with the accompanying drawings forming a part of it in which:

Figure 1:
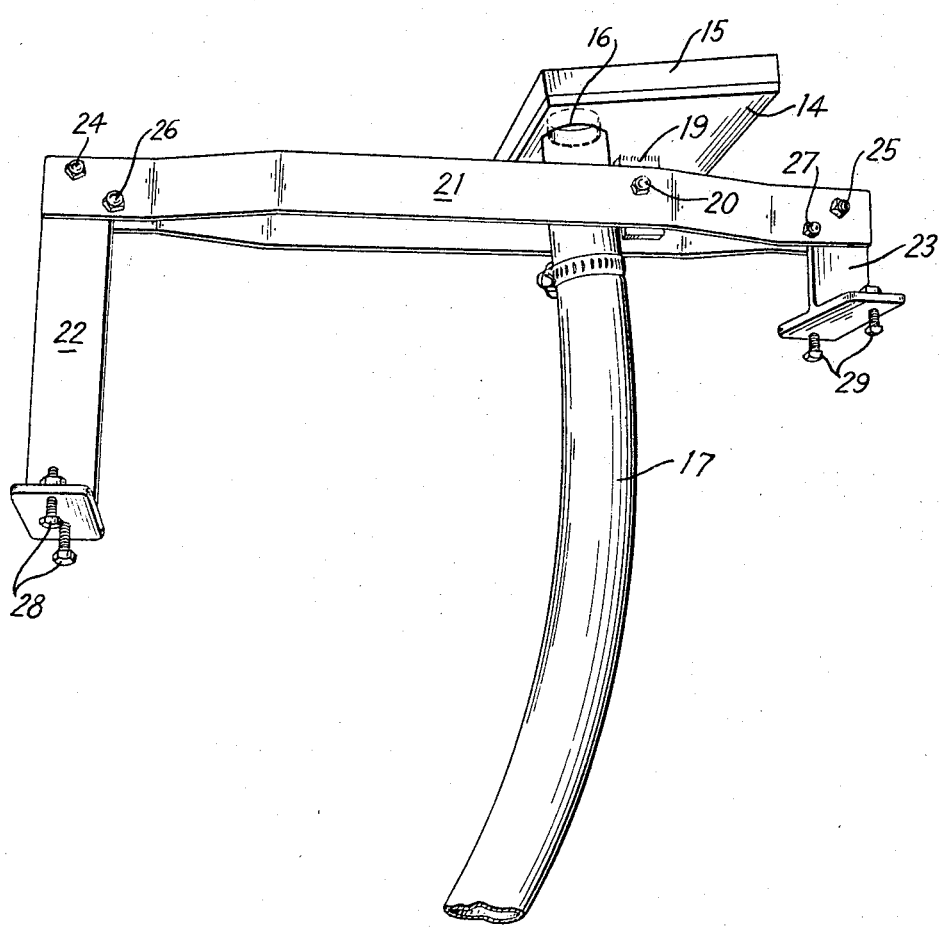
FIG. 1 is a perspective view of a representative form of carton filling machine attachment useful in the practice of this invention.

In the following description and in the claims various details will be identified by specific names for convenience. The names, however, are intended to be generic in their application. Corresponding reference characters refer to corresponding parts in the several figures of the drawings.

The drawings accompanying and forming part of this specification disclose certain specific details for the purpose of explanation of broader aspects of the invention, but it should be understood that structural details may be modified in various respects without departure from the principles of the invention and that the invention may be incorporated in, and practiced by means of, other structural forms than shown.

In the practice of the invention a substantially unrestricted flow of ice cream is admitted from the freezer through the supply duct and its open valve, but the outflow from the nozzle is temporarily restricted to a fraction of the nozzle's normal discharge capacity. This restriction is maintained for a period sufficient to reduce the nozzle temperature from room temperature to substantially the temperature of the ice cream and the ice cream is discharged meanwhile at the reduced rate into a suitable receptacle for return to the freezer. The flow restriction is then removed, whereafter the nozzle discharges ice cream of the proper temperature and, hence, consistency into the packaging receptacles, one after another, in a conventional manner.

The shape of the filler nozzle depends on the shape of the packaging receptacle to be filled. The accompanying drawings illustrated equipment for filling one-half gallon paperboard cartons through a nozzle 11 of rectangular cross section (FIG. 3) receiving ice cream through a supply duct 12 fitted with a shutoff valve 13 which is closed during periods of non-operation, causing the nozzle structure gradually to assume room temperature.

The outflow from the nozzle may be restricted in any suitable manner, preferably near or at the nozzle mouth so as to subject all of the nozzle mass to the cooling action.

This is most conveniently accomplished by providing a shutoff baffle plate 14 fitted with an appropriate sealing gasket 15 to be pressed against the nozzle mouth in any convenient manner.

Figure 2:
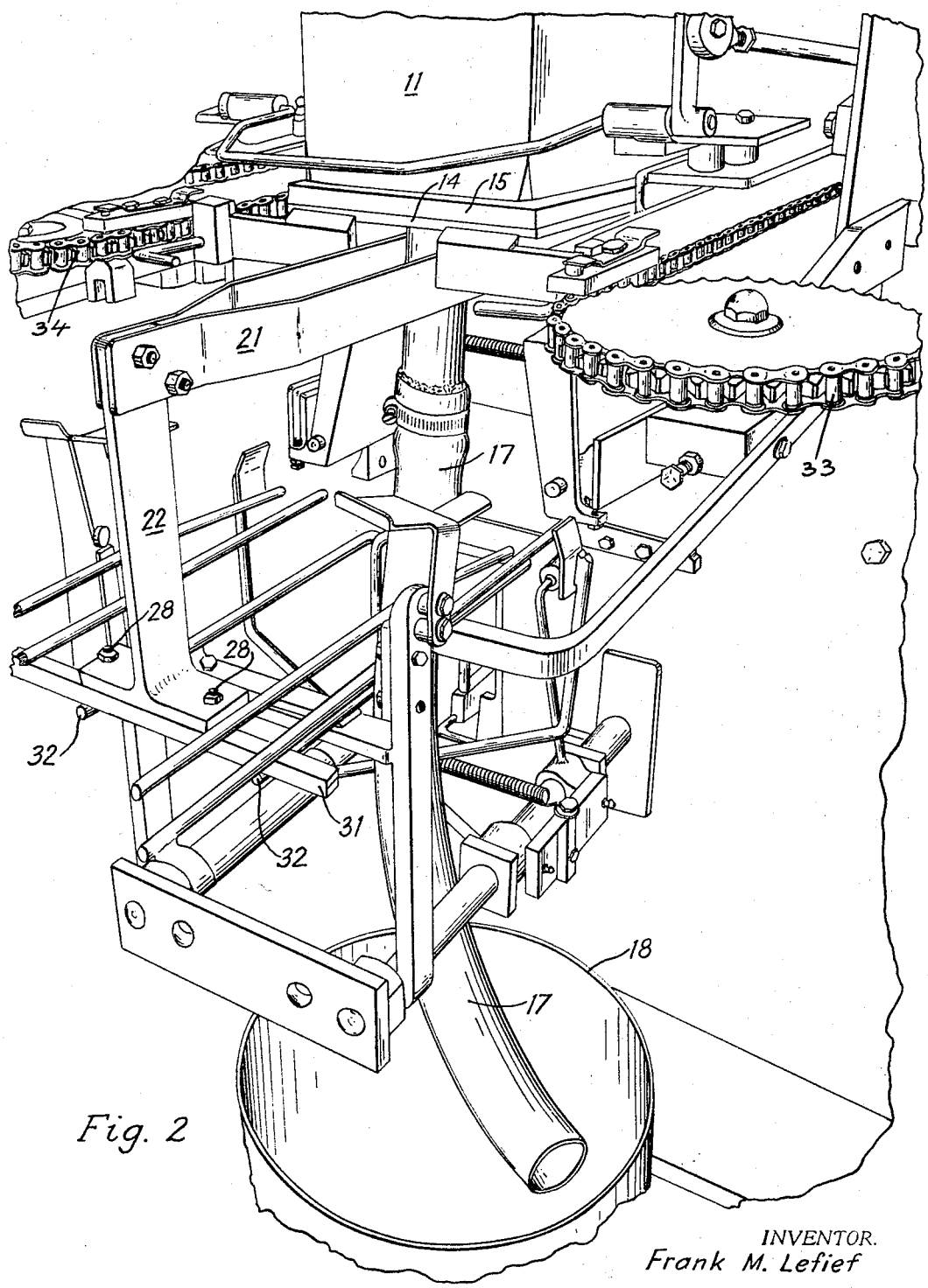
FIG. 2 is a perspective view of a portion of a carton filling machine, as seen from a point downstream with respect to the filler nozzle with the attachment of FIG. 1 in place.

Baffle plate 14 and gasket 15 have an aperture 16 therethrough from which a discharge duct 17 extends downwardly to a suitable point of collection of softened ice cream, for example a pail 18 (FIG. 2).

The plate 14 has a downwardly extending boss 19 which is pivotally mounted at 20 on a cross beam 21 to which two posts 22 and 23 are pivotally mounted at 24 and 25.

The posts may be moved into a position substantially in line with the beam 21 and are in the illustrated operative closing position substantially at right angles thereto, in which position they swing against bolts 26, 27 acting as stops.

The posts are adjustable in height by means of adjustable feet 28, 29 which may be shortened or lengthened to provide the proper sealing compression of the gasket 15 under the mouth of the nozzle.

The device of FIG. 1 is placed under the nozzle by hand, whereafter its posts 22, 23 are swung down into right angular position in which the feet 29 (FIG. 3) rest on a plate 30 of the filling machine. The feet 28 of the post 22, which in FIG. 2 are shown to have a transverse bar 31 attached to them, rest on rods 32 of the machine which normally support empty cartons.

Figure 3:
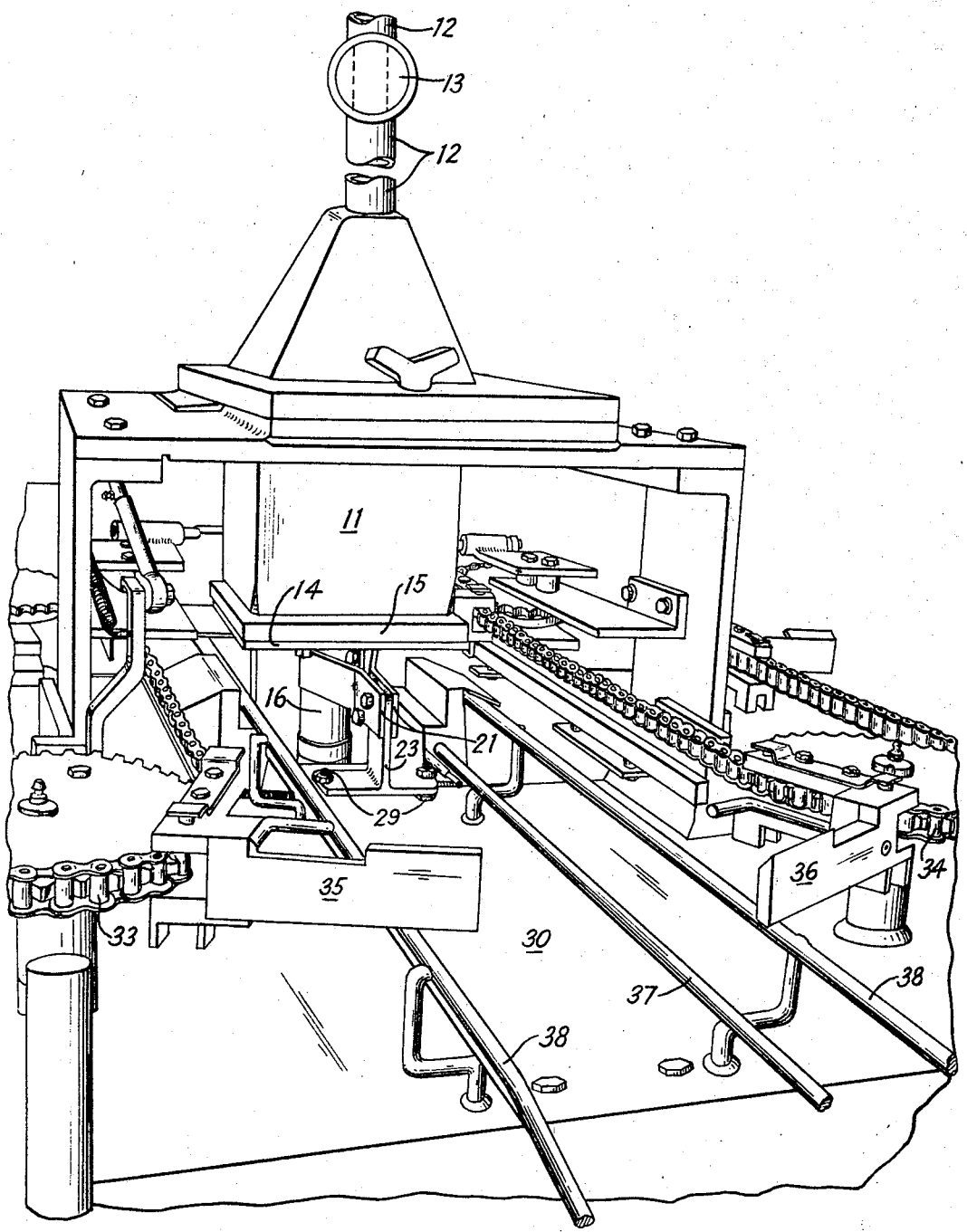
FIG. 3 is a perspective view of the machine and attachment of FIG. 2 as viewed from a point upstream with respect to the filler nozzle.

FIG. 3 further shows lateral conveyors 33 and 34 comprising lugs 35, 36 for moving filled cartons (not shown) from the nozzle 11, where they were filled, toward the observer of FIG. 3. The cartons move on rails 37 between side guides 38.

Referring to FIG. 2, empty cartons arrive from the left on rods 32, are moved under the nozzle 11, and are then raised into a position in which they telescope over the nozzle mouth. During filling the cartons are gradually lowered and then move away to the right of FIG. 2.

As FIG. 3 is a view from the opposite side, the filled cartons move toward the observer of FIG. 3. It is, of course, understood that in order to permit the cartons to move, the device of FIG. 1 must first be removed.

The filling procedure described above is conventional and known.

In the practice of the invention the device of FIG. 1 is placed under the nozzle 11 while the valve 13 is still closed. The valve 13 is then opened, whereby ice cream is caused to flow through the nozzle at the reduced rate set by the restricted nozzle to cool the same. The spent ice cream is collected at 18.

When the nozzle is sufficiently cool, as may be observed by frosting, or ascertained by touch, of the metal parts, the valve 13 is closed and the assembly of FIG. 1 is removed. Cartons are then supplied for transport toward the nozzle 11 and the valve 13 is opened.

The carton first to be filled receives ice cream of the proper consistency and temperature and the subsequent packaging procedure may then follow conventional practice.

What is claimed is:

1. In the method of operating an ice cream filler of the type in which ice cream flows through a duct to a filler nozzle which normally discharges the ice cream into packaging receptacles, the said duct being controlled by a shutoff valve installed in the duct upstream with respect to said nozzle, the steps of
   admitting a substantially unrestricted flow of ice cream through said valve to said nozzle;
   temporarily restricting, at the mouth of said nozzle, the outflow from said nozzle to a fraction of the normal nozzle outflow capacity, if unrestricted;
   and maintaining the restriction for a period sufficient to reduce the nozzle temperature from substantially room temperature to substantially the temperature of the ice cream while discharging during the period of restriction ice cream at the restricted rate set by the restriction.

2. In the method of operating an ice cream filler of the type in which ice cream flows through a duct to a filler nozzle which normally discharges the ice cream into packaging receptacles, the said duct being controlled by a shutoff valve installed in the duct upstream with respect to the said nozzle, the steps of
   admitting a substantially unrestricted flow of ice cream through said valve to said nozzle;
   temporarily restricting, at the mouth of said nozzle, the outflow from said nozzle to a fraction of the normal nozzle outflow capacity, if unrestricted;
   maintaining the restriction for a period sufficient to reduce the nozzle temperature from substantially room temperature to substantially the temperature of the ice cream;
   and discharging during the period of restriction ice cream passing through said nozzle in a manner to by-pass said packaging receptacles.

3. In the method of operating an ice cream filler of the type in which ice cream flows through a duct to a filler nozzle which normally discharges the ice cream into packaging receptacles, the said duct being controlled by a shutoff valve installed in the duct upstream with respect to the said nozzle, the steps of
   first admitting a flow of ice cream substantially unrestricted by said valve to said nozzle while temporarily restricting, at the mouth of the nozzle, the outflow from the nozzle to a fraction of the normal nozzle outflow capacity while discharging the fractional flow in a manner to by-pass said receptacles;
   maintaining the restriction for a period sufficient to reduce the nozzle temperature from its initial temperature approximating room temperature to substantially the temperature of the ice cream;
   and then removing the restriction and substantially simultaneously with the removal discharging ice cream from said nozzle into the receptacles.

4. In an ice cream filler of the type in which ice cream flows through a duct to a filler nozzle adapted to discharge ice cream into packaging receptacles and in which a shutoff valve is installed in said duct at a point upstream of the nozzle, the improvement which comprises a closure member adapted to be placed over the mouth of the filler nozzle, said closure member having a discharge passage therethrough of a cross sectional area less than the cross sectional area of the nozzle mouth; and means for removably applying said closure member to the nozzle mouth.

5. In an ice cream filler comprising an ice cream supply duct, a shutoff valve in said duct and a discharge nozzle at the end of said duct for discharging through its mouth ice cream into packaging receptacles, the improvement which comprises a plate, said plate having an aperture therethrough of a cross section smaller than the cross section of the nozzle mouth; a resilient sealing element on said plate; a discharge duct extending from said aperture; and means for removably placing said plate against said nozzle with said element in sealing relationship against the mouth.

References Cited
UNITED STATES PATENTS 2,152,339  3/1939  Anderson _____ 141—82

ROBERT B. REEVES, *Primary Examiner.*

F. R. HANDREN, *Assistant Examiner.*